United States Patent
Eckensmiller

(10) Patent No.: US 7,044,427 B2
(45) Date of Patent: May 16, 2006

(54) CHRISTMAS TREE STAND

(76) Inventor: Edgar Grant Eckenswiller, 168 Bayview Avenue, Port McNiccol, Ontario (CA) L0K 1R0

( * ) Notice: Subject to any disclaimer, the term of this patent is extended or adjusted under 35 U.S.C. 154(b) by 195 days.

(21) Appl. No.: 10/832,694

(22) Filed: Apr. 22, 2004

(65) Prior Publication Data

US 2005/0236549 A1 Oct. 27, 2005

(51) Int. Cl.
*F16M 13/02* (2006.01)

(52) U.S. Cl. .................. 248/523; 248/529; 47/40.5

(58) Field of Classification Search ............. 248/523, 248/524, 529, 519, 518, 188.7, 527, 346.03, 248/346.06; 47/40.5; D11/130.1
See application file for complete search history.

(56) References Cited

U.S. PATENT DOCUMENTS

| | | | | |
|---|---|---|---|---|
| 2,630,994 A | | 3/1953 | Dicoskey .................... | 47/40.5 |
| 2,701,699 A | | 2/1955 | Chapin ....................... | 47/40.5 |
| 2,913,202 A | * | 11/1959 | Meldrum .................... | 47/40.5 |
| 4,119,290 A | * | 10/1978 | Gies ........................... | 248/523 |
| 4,261,138 A | | 4/1981 | St. George Syms ........ | 47/40.5 |
| 4,571,881 A | | 2/1986 | Lathim ....................... | 47/40.5 |
| 4,825,586 A | | 5/1989 | Coppedge .................. | 47/40.5 |
| 5,497,972 A | | 3/1996 | Sofy ........................... | 248/523 |
| 5,725,193 A | | 3/1998 | Adams ....................... | 248/523 |
| D442,883 S | * | 5/2001 | Finch ........................ | D11/130.1 |
| 6,227,513 B1 | | 5/2001 | Richard ..................... | 248/346.07 |

FOREIGN PATENT DOCUMENTS

| | | | |
|---|---|---|---|
| EP | 1364604 A1 | * | 11/2003 |
| FR | 2629176 A1 | * | 9/1989 |
| GB | 2208591 A | * | 4/1989 |

* cited by examiner

*Primary Examiner*—Gwendolyn Baxter
(74) *Attorney, Agent, or Firm*—Needle & Rosenberg, P.C.

(57) ABSTRACT

A Christmas tree stand of the kind having a container to receive water and a tree trunk and a plurality of stabilizing legs radiating outwardly from the side walls of the container includes a novel clamping mechanism comprising a plurality of gripping means, each made up of a plunger having a concave tree clamping portion, a pair of parallel arms extending therefrom with free distal ends and resiliently joined at the front of the tree clamping portion. The arms of the plunger extend through a guide member and resiliently releasable locking means are provided, whereby the plunger can be readily pushed forward to press against the tree trunk but is locked against outward movement unless and until the arms of the plunger are squeezed together to release the locking means.

14 Claims, 11 Drawing Sheets

CHRISTMAS TREE STAND

BACKGROUND OF THE INVENTION

1. Field of the Invention

The field of the invention relates to support stand apparatus and more particularly to a Christmas tree stand with a new and improved clamping mechanism to accommodate and securely hold tree trunks in a wide range of diameters.

2. Description of the Prior Art

A wide variety of Christmas tree stands have been developed and appear in the patent literature. Most of these are of the type which comprises a water-holding receptacle to receive the tree trunk, from the base of which radially extend a plurality (three or four) of stabilizing feet. Near the opening of the receptacle there is provided a cover, collar or a cylindrical neck associated with gripping means to clamp the trunk and maintain the tree in a vertical position.

The greatest variation among Christmas tree stands of this general type-and the source of most practical difficulties-resides in the structure of the gripping means.

In many such Christmas tree stands, metal screws or clamps are provided to hold the tree trunk in the stand as in U.S. Pat. Nos. 2,630,994 and 4,571,881. The tendency of the end of the screws to pierce the trunk, negatively affecting the stability of gripping engagement, has been sought to be addressed in some devices by equipping the screw ends with arcuate clamping plates or other contoured gripping members as, for example, in U.S. Pat. Nos. 4,825,586 and 5,725,193. Nevertheless, such devices are often subject to insecure gripping action by reason of the limited surface area over which force is applied to the tree trunk by threaded members. There is the further disadvantage with threaded members for the threads to back off and loosen the clamping or, particularly with metal screws, to seize up making it difficult and inconvenient to release the gripping engagement with the tree trunk.

In other such tree stands, the gripping of the tree trunk is effected or augmented by insertion between the holder and the trunk of wedge-shaped gripper inserts. Examples are provided by U.S. Pat. Nos. 2,701,699; 4,261,138; and 5,497,972. If undesired migration of the wedge inserts from their gripping position is to be reliably prevented, however, a locking mechanism is generally required, adding to the complexity and cost of construction of the tree stand.

It is a primary object of the present invention to provide a Christmas tree stand with a novel clamping mechanism which is simple to erect and disassemble and easy to use.

It is a further object of the invention to provide a Christmas tree stand which can accommodate a wide range of tree diameters and exert a constricting force on the tree trunk without the aforementioned disadvantages of common screw systems.

It is a still further object of the invention to provide a disassemblable Christmas tree stand in which all components are made of injection moulded thermoplastic materials, which will not rust in use or mark up the surface on which the stand is erected.

SUMMARY OF THE INVENTION

With a view to achieving these objects and overcoming the disadvantages of prior known tree stands, I have invented a Christmas tree stand which comprises a container with a bottom wall, side walls and a top opening with a peripheral edge to hold water and receive a tree trunk therein. The container presents a regular plurality of stabilizing legs attached to and radiating outwardly from the side walls of the container.

Attached to the periphery of the container opening is a plurality of novel tree trunk gripping means each of which comprises a plunger member having a concave tree clamping portion and a pair of parallel arms extending therefrom with free distal ends and resiliently joined at the front to the tree clamping portion.

The arms of the plunger extend through channels in a guide member releasably attached to the periphery of the container. The arms of the plunger and the interior walls of the channels through the guide member are provided with resiliently releasable cooperating locking means, whereby the plunger can readily be advanced manually to press against the tree trunk but is locked against radially outward movement, unless the resilient arms of the plunger are squeezed together to release the locking means.

According to a preferred embodiment of the tree stand of the invention, all components are made of an injection-moldable thermoplastic which imparts the flexible resiliency to the arms of the plunger.

For added stability, it is preferable to provide the bottom wall of the container with stepped concentric ridges to adaptively receive the bottoms of tree trunks of various diameters.

Other objects and advantages of the present invention will be evident from the following description of preferred embodiments shown in the accompanying drawings.

DESCRIPTION OF THE PREFERRED EMBODIMENT

Figure 5:
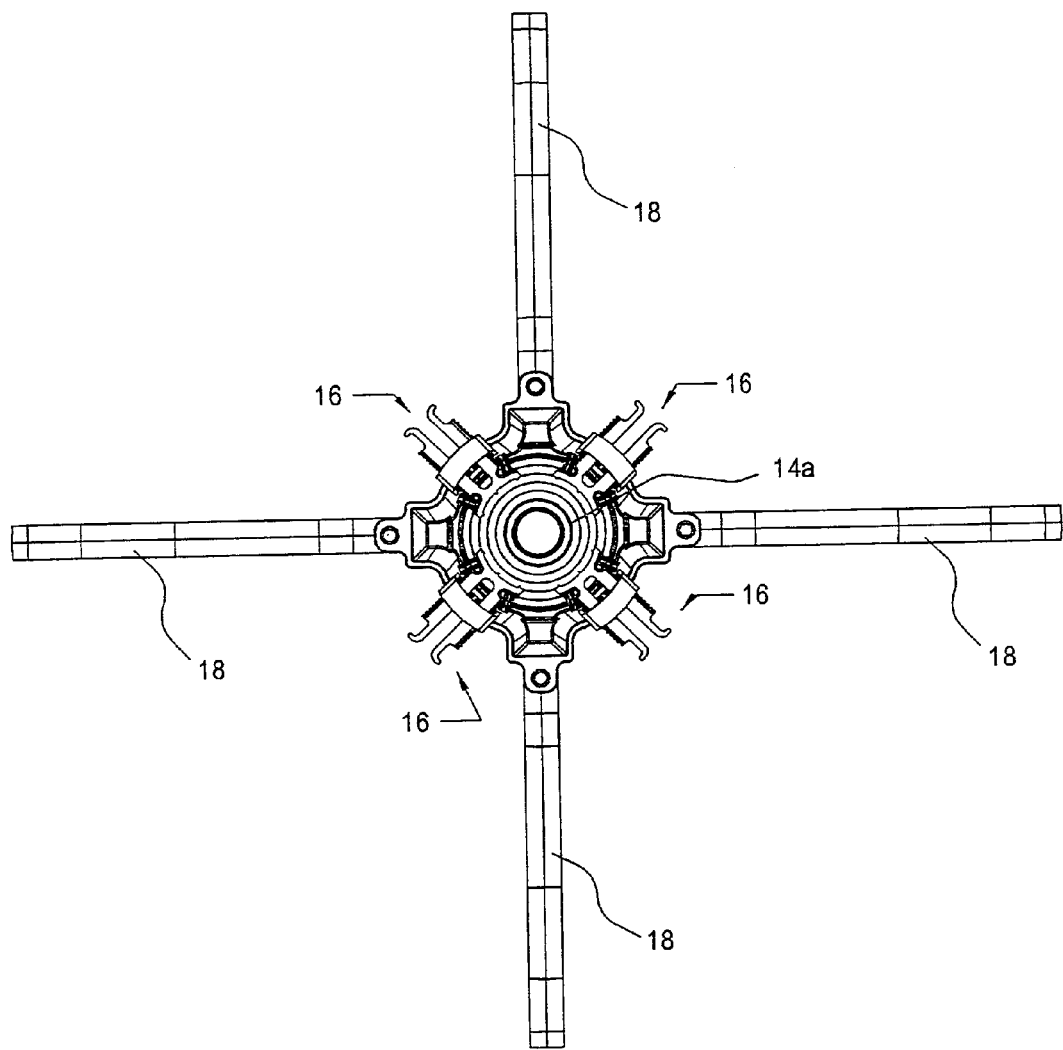
FIG. 5 is a top plan view of the stand of FIG. 4.
Figure 5A:
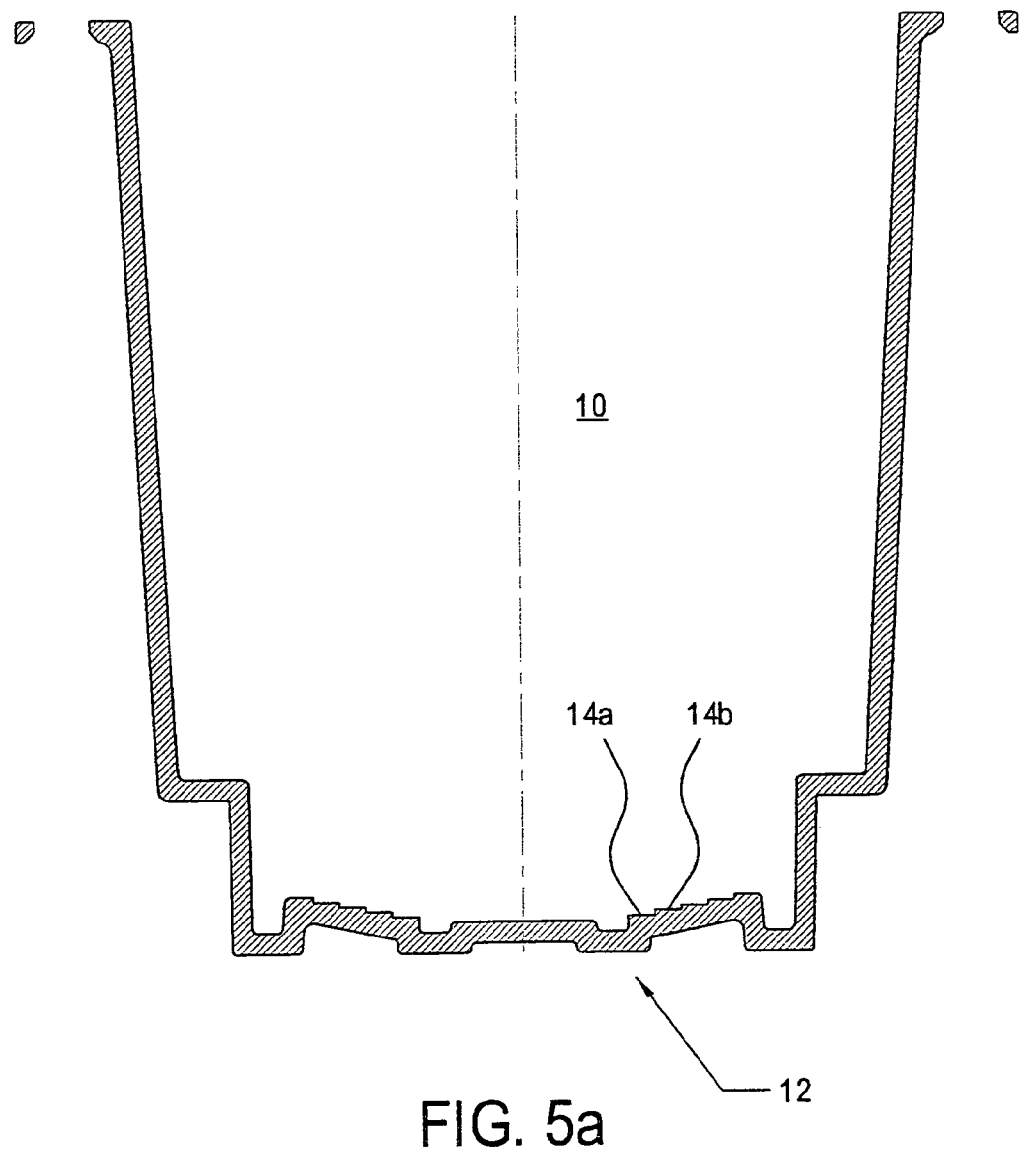
FIG. 5a is an enlarged cross-sectional view of a container for the Christmas tree stand, according to a preferred embodiment of the invention.

The tree stand includes a cup shaped container 10 closed at its bottom 12 to receive the trunk 13 of an artificial or sawn natural Christmas tree. Preferably, as best seen in the views of FIGS. 5 and 5A, the interior of cup bottom 12 presents an upwardly and outwardly widening concentric arrangement of annular ledges 14a, 14b, etc., the better to receive the bottom of the trunk in a circular recess for added stability.

Figure 1:
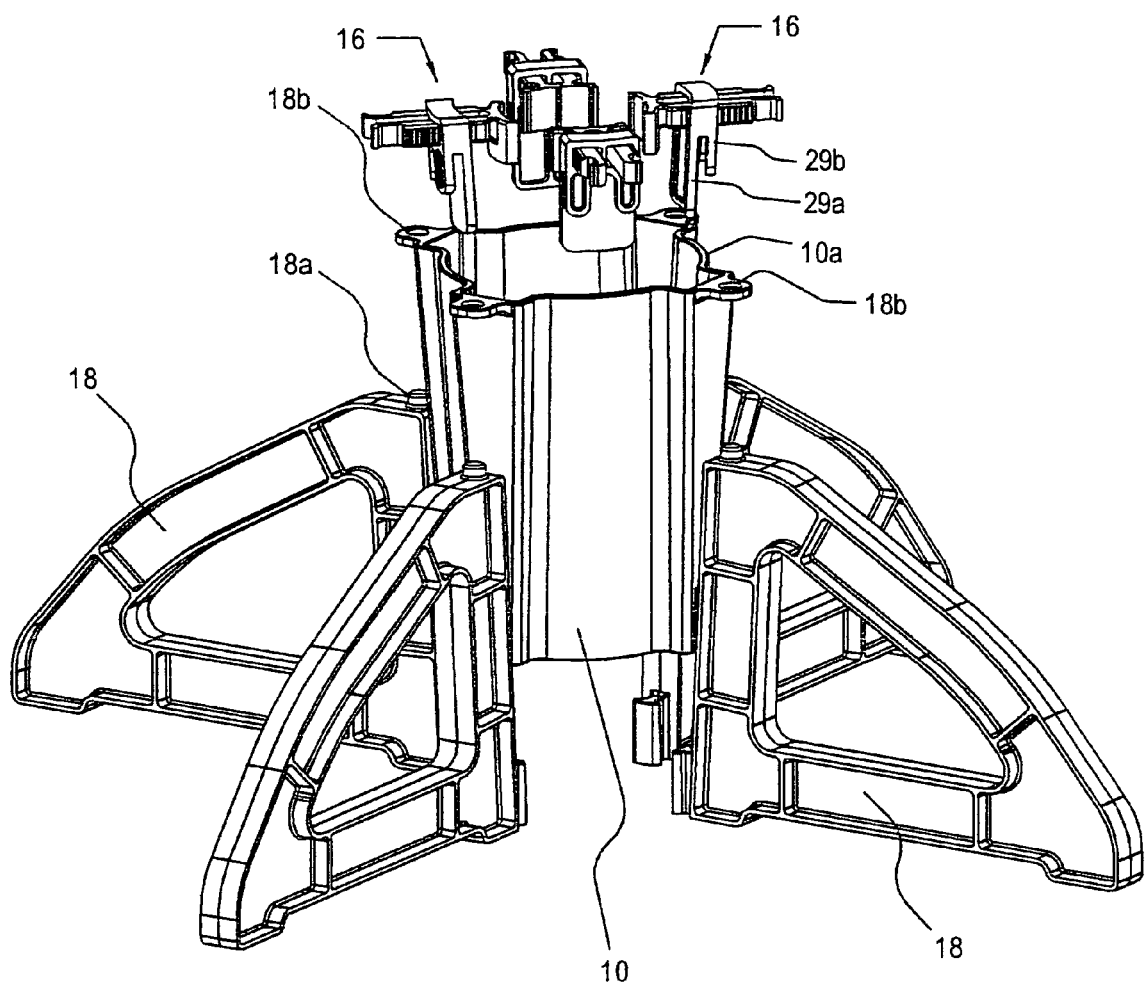
FIG. 1 is an exploded perspective view of the preferred embodiment of my Christmas tree stand.

Cup 10 has an upper peripheral edge formation 10a, best seen in FIG. 1, to which are releasably mounted a plurality (here four) clamping means 16. The tree stand is stabilized on the floor or other supporting surface by a regularly angularly disposed plurality of stabilizing feet 18.

Figure 1A:
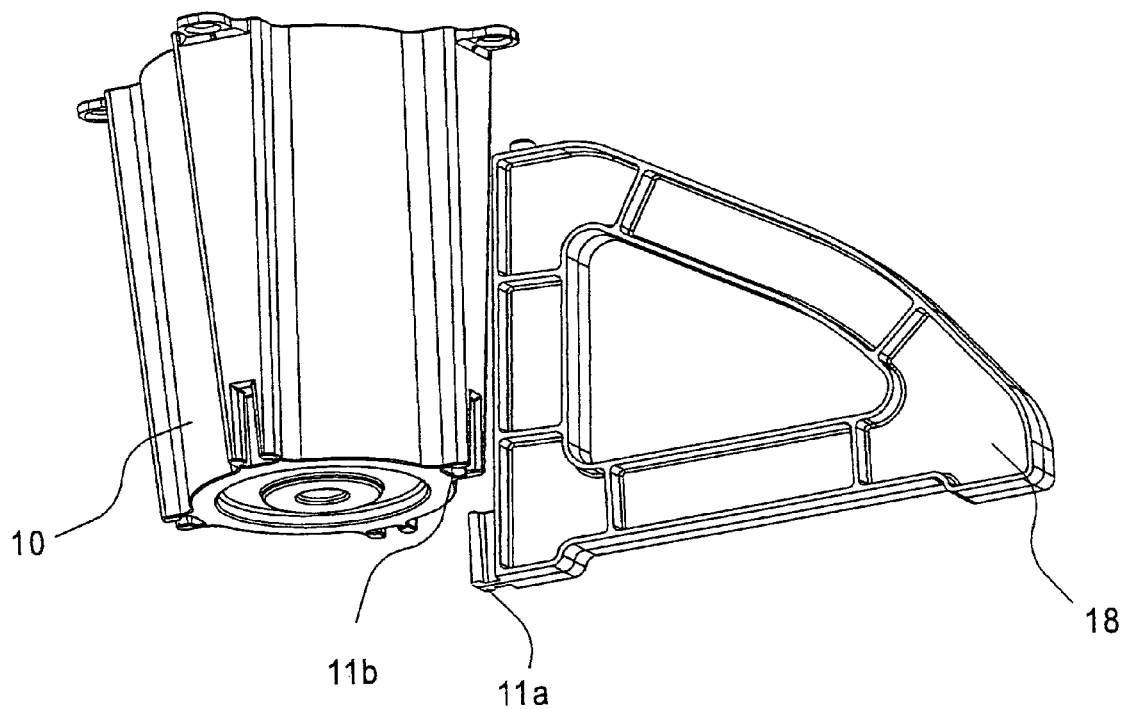
FIG. 1a is a partial perspective view of the Christmas tree stand of FIG. 1, illustrating the means of reversible attachment of a stabilizing leg to a mating recess provided at the bottom of the central container.
Figure 2:
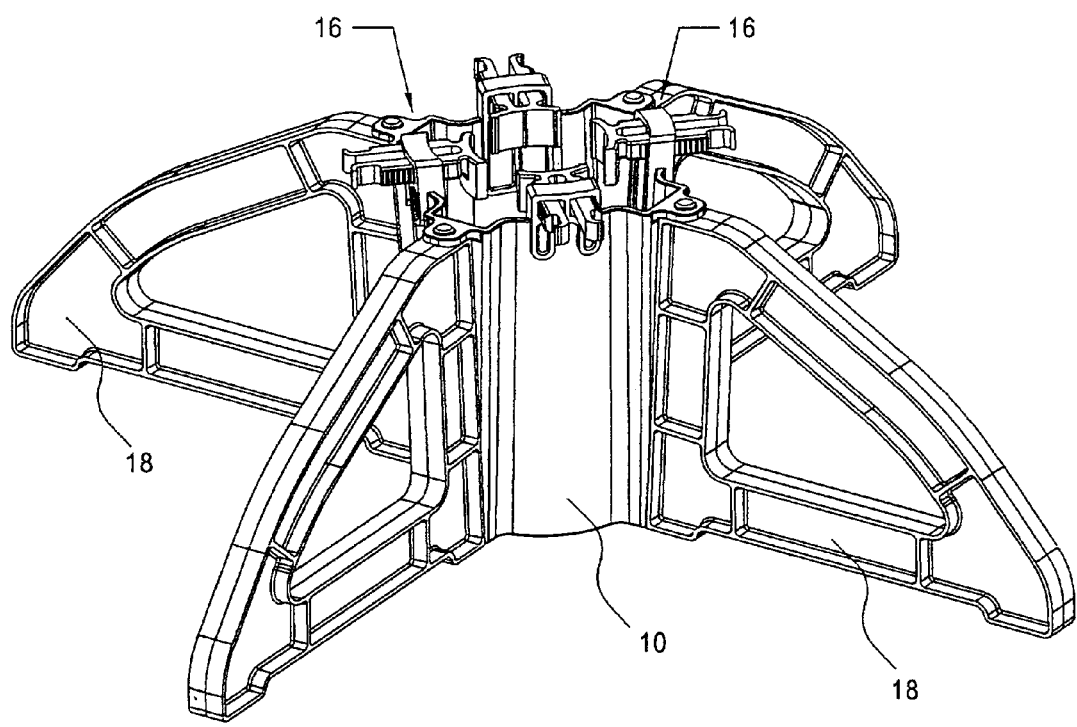
FIG. 2 is a perspective view of the tree stand of FIG. 1 in its assembled configuration ready to receive a tree.

As best seen in FIG. 1a for ease of assembly and disassembly, cup 10 may advantageously be formed with lower peripheral slots 11b which slidably mate with corresponding projections 11a on the stabilizing legs 18 in a releasable tongue-and-grove connection. At the top of the legs 18 are formed bosses 18a which fit through mating holes in corresponding flanges 18b on the periphery 10a of the cup, as best seen in FIG. 1.

Figure 6:
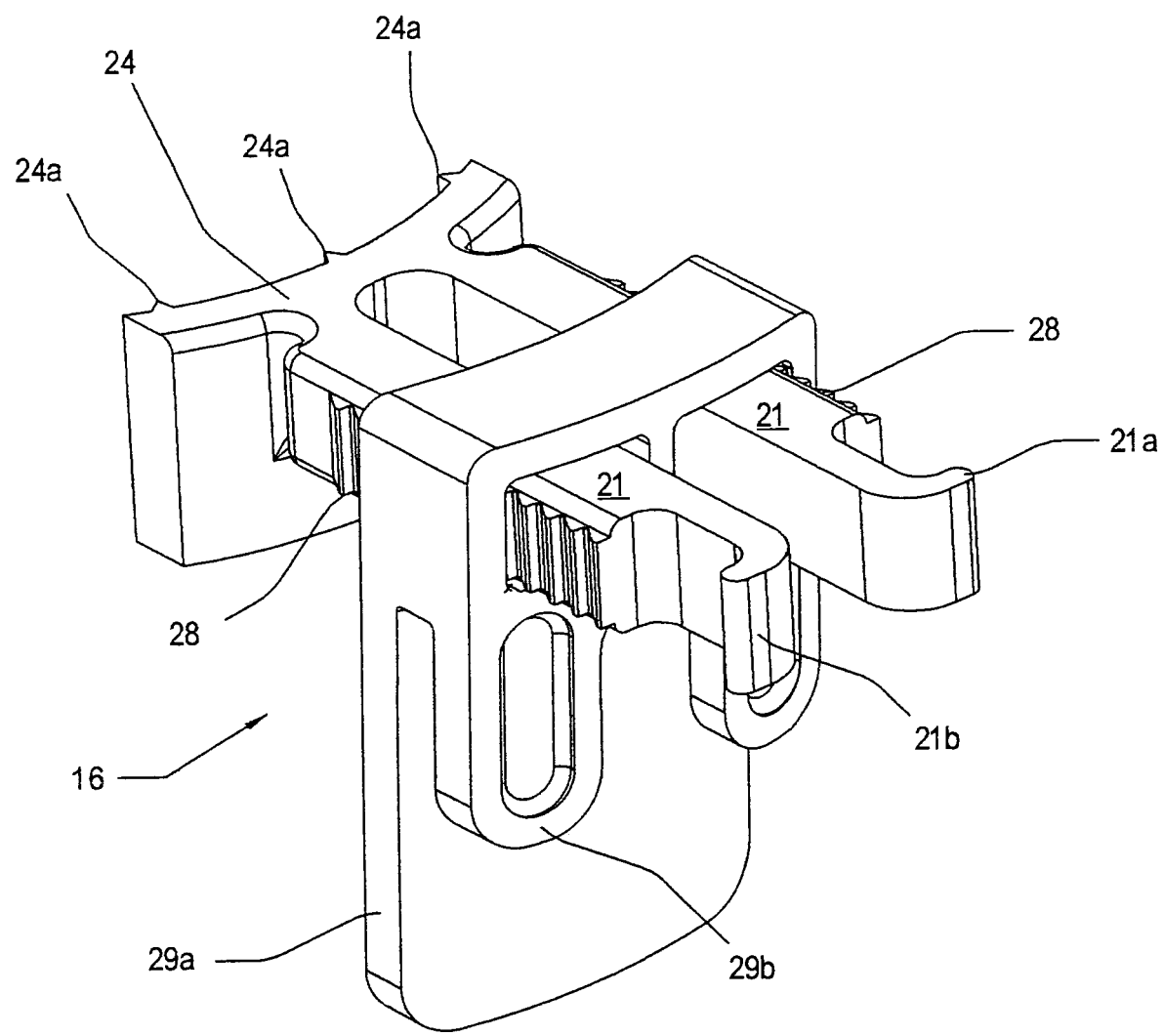
FIG. 6 is an enlarged perspective view of the novel tree gripping means in the Christmas tree stand of my invention.

FIG. 6 gives an enlarged detailed view of one of the four gripping means shown in FIGS. 1–4. Each gripping means 16 has two interacting components. A plunger member 20, shown in isolation in FIG. 6A, and a guide member 22, shown in isolation in FIG. 6B. The plunger member 20 is fabricated of a suitable solid, resilient thermoplastic such as polypropylene or nylon, which resiliently resists manual squeezing together of the ends 21a and 21b of generally parallel plunger arms 21.

At their proximal end, arms 21 join with a concave tree clamping portion 24 of the plunger, the forward surface of which bears against the tree trunk in use. Arms 21 are slidably received within upper rectangular channels through the body of guide member 22. Free longitudinal sliding of arms 21 through channels 26 can occur only when the handles 21a and 21b are manually squeezed slightly together to disengage a locking mechanism.

Figure 6A:
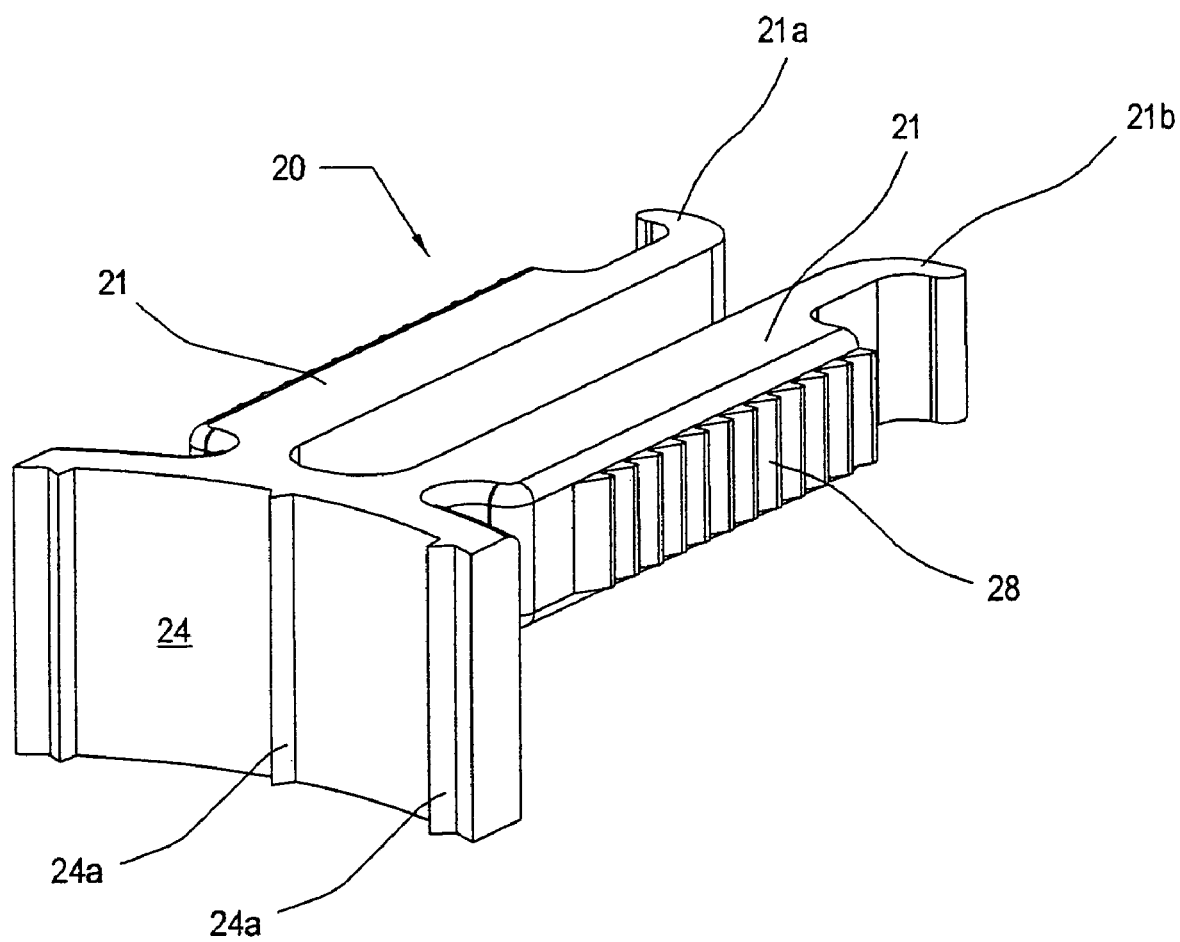
FIG. 6a shows in isolation the plunger portion of the gripping means of FIG. 6.
Figure 6B:
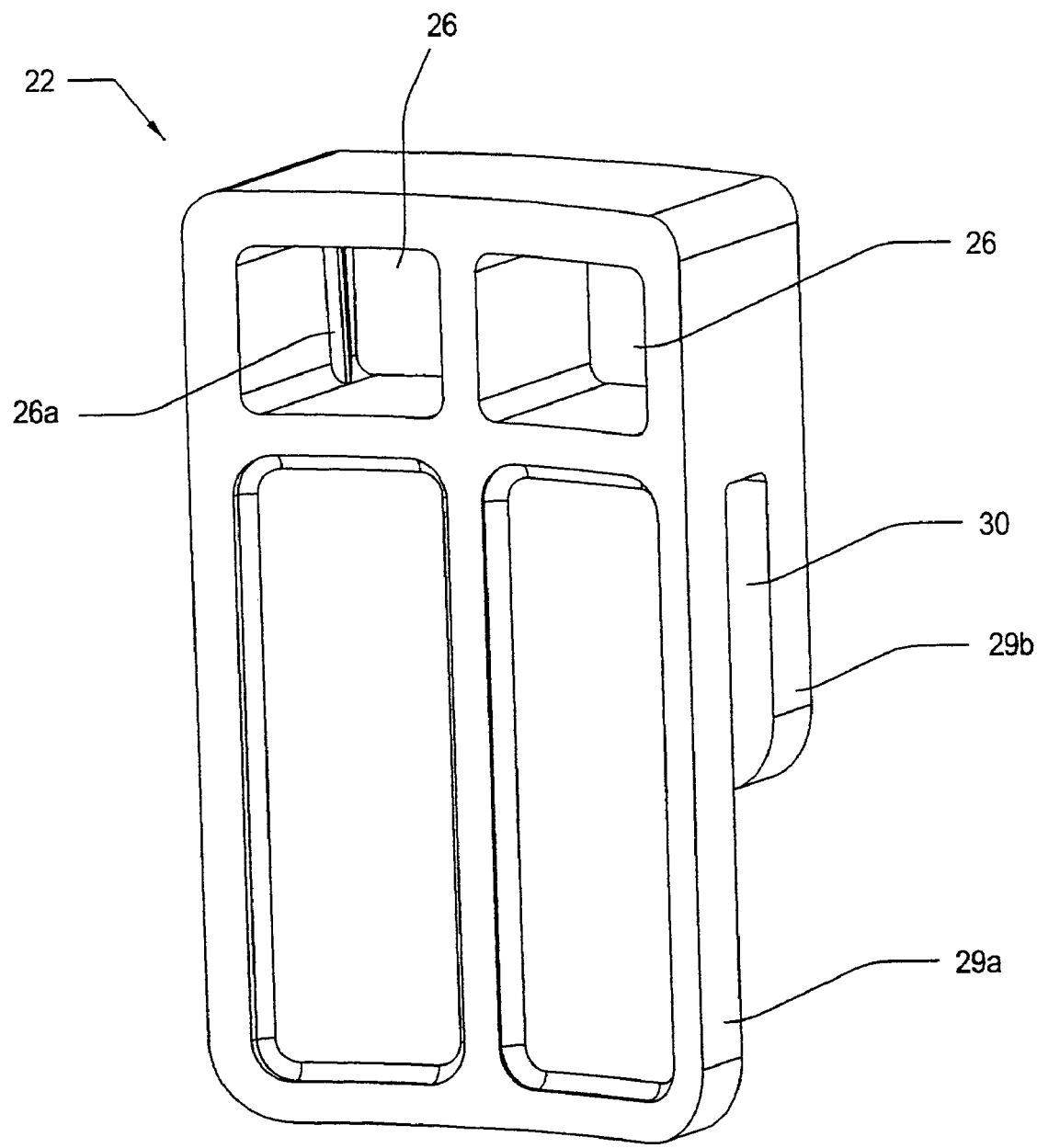
FIG. 6b shows in isolation the guide member of the gripping means of FIG. 6.

The locking mechanism in the preferred embodiment comprises rows of generally triangular latching teeth 28 on opposed lateral sides of arms 21 and cooperating ratchet formations 26a disposed on the interior walls of the channels of guide member 26. The guide members can be permanently affixed to the periphery of cup 10, but in a preferred embodiment, as best illustrated in FIGS. 1 and 6B, guide member 22 includes downwardly depending inner flange 29a and outer flange 29b defining a slot-like space 30 between them to allow the guide member to be slid down over a portion of cup rim 10a.

All components may be made of the same suitable plastic material and fabricated by injection moulding. Being entirely of plastic construction, the assembled stand does not mark up flooring or rust as metal stands do.

Figure 3:
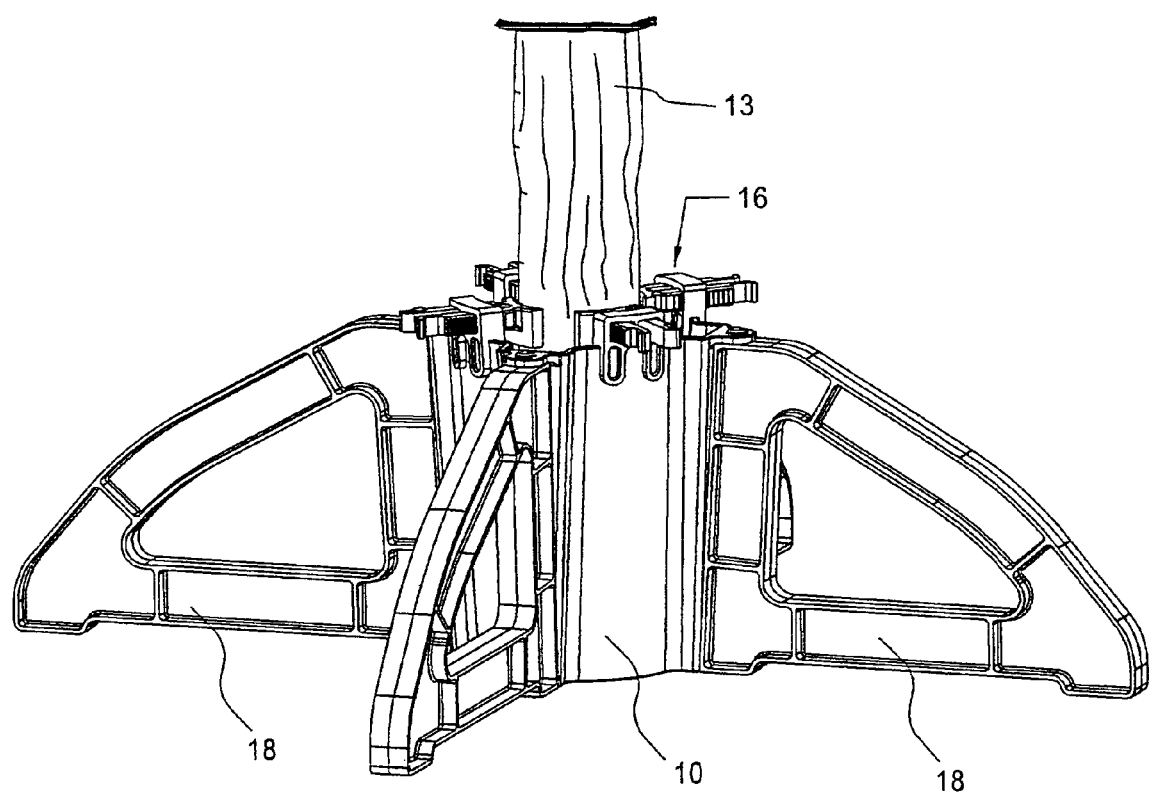
FIG. 3 is the perspective view of the Christmas tree stand of the FIG. 2, but showing the bottom portion of a tree trunk clamped in position in use.
Figure 4:
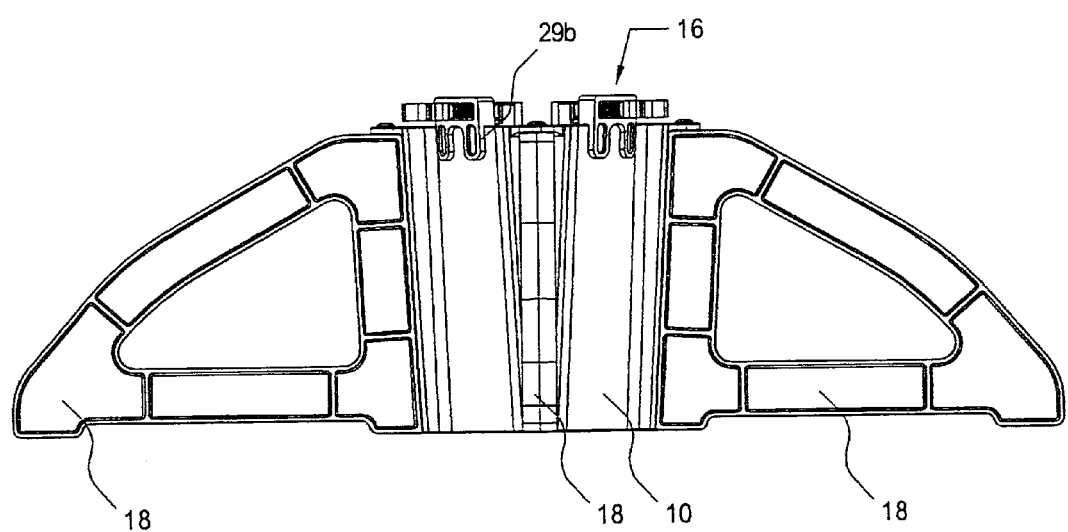
FIG. 4 is a side elevational view of the tree stand of FIG. 2, seen in the direction of one of the four stabilizing legs of the stand.

Referring to FIG. 3, to set up a Christmas tree in the stand, the user simply manually retracts the latch clamps, inserts the trunk of the tree, then manually advances the plungers to tightness against the tree trunk, with the tree held erect.

Preferably, the concave tree clamping portions 24 are made in the form of part-cylindrical panels configured jointly to embrace as much of the circumference of the tree as possible, to optimize constrictive retention of the tree trunk in its desired vertical orientation. Different sets of plungers, adapted to release and lock with the same guide members 26, but having tree clamping portions 24 of different radii of curvature could be provided to allow for optimal clamping of trees in a wide range of trunk sizes.

Figure 7:
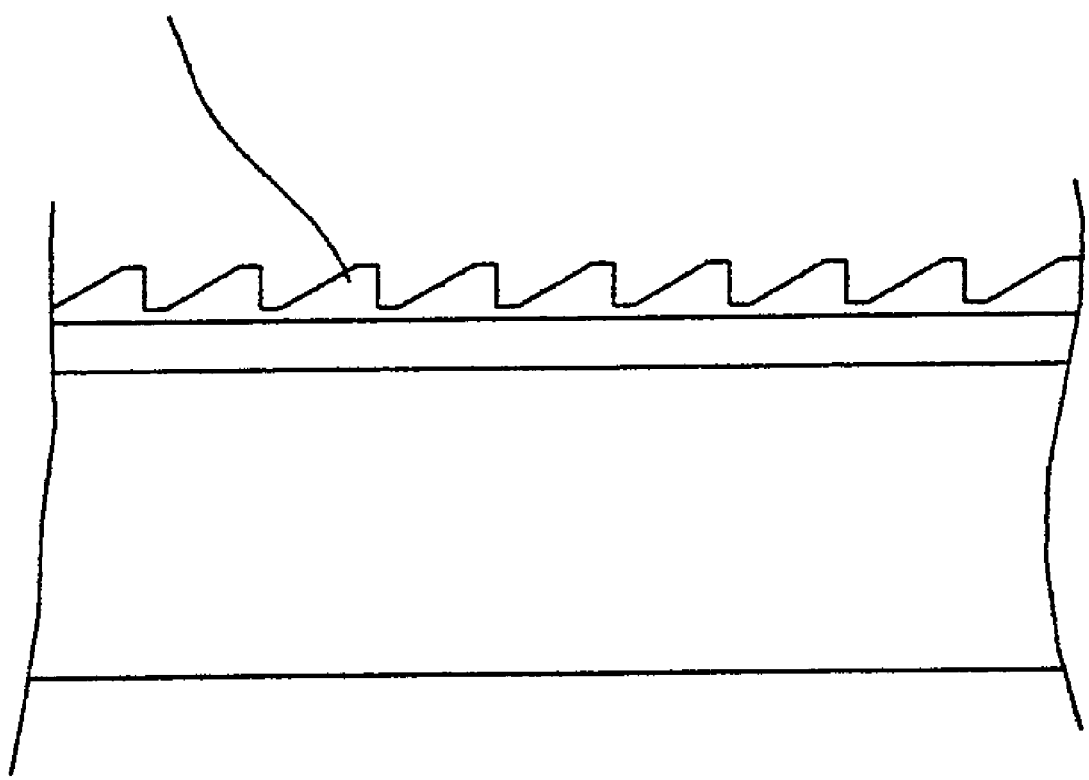
FIG. 7 shows in enlargement an alternative configuration for the generally triangular latching formations on the arm of the plunger in gripping means according to the invention.

For still better gripping, tree clamping portion 24 may advantageously be provided with sharp triangular projections 24a to grip the tree trunk surface. Although the trunk gripping means of the invention as illustrated in FIGS. 6, 6A and 6B use latched teeth of exactly triangular section with appropriate mating ratchets 26a in the guide member channels 26, as seen in FIG. 7 a truncated triangular configuration of teeth 28a can also be used and may impart still greater durability over time to the locking mechanism.

While a particular embodiment and variants thereof have been disclosed herein for the purposes of clear explication, it is to be understood that my invention is not limited to the specific embodiment but may be variously made within the scope of the following claims.

The invention claimed is:

1. A Christmas tree stand, comprising:
   a container having a bottom wall, side walls and a top opening with a peripheral edge formation to hold water and receive a tree trunk therein;
   a regular plurality of stabilizing legs attached to and radiating outwardly from the side walls of the container; and
   a plurality of tree trunk gripping means, each comprising:
   (i) a plunger member having a concave tree clamping portion and a pair of generally parallel arms extending therefrom, the arms having free distal ends and common proximal ends integrally and resiliently joined to the tree clamping portion;
   (ii) a guide member releasably attached to said peripheral edge formation having a pair of channels therethrough to slidably receive respective arms of the plunger in radial alignment with the container as the clamping portion faces the tree trunk; and
   (iii) resiliently releasable cooperating locking means between the arms and channels, said locking means including cooperating projections and grooves located on respective arms and channels, whereby said plunger can be manually advanced to engage said gripping means with the tree trunk, but is locked against radially outward movement unless the arms of the plunger are squeezed together.

2. A Christmas tree stand according to claim 1, wherein said plunger member is made of a solid, resilient thermoplastic.

3. A Christmas tree stand according to claim 2, wherein each of said concave tree clamping portions is a part-cylindrical panel.

4. A Christmas tree stand according to claim 3, wherein the size and curvature of said part-cylindrical panels is selected to maximize the portion of the tree trunk circumference gripped by said plurality of tree trunk gripping means for tree trunks having diameters falling within a given range.

5. A Christmas tree stand according to claim 2, wherein said locking means comprises a row of generally triangular latching teeth formed on opposed lateral sides of each of said arms, and cooperating ratchet formations on the interior walls of the channels of said guide member.

6. A Christmas tree stand according to claim 2, wherein said guide member has an upper portion through which said channels pass and an integral lower portion including parallel depending flanges defining a slot therebetween to receive and releasably attach to a portion of said peripheral edge formation of the container with said pair of channels positioned above the peripheral edge formation around the opening of the container.

7. A Christmas tree stand according to claim 6, wherein said concave tree clamping portion presents a plurality of sharp projections to tightly engage the tree trunk.

8. A Christmas tree stand according to claim 6, wherein said plurality of tree trunk gripping means comprises four gripping means positioned at right angles around the top opening of the container in diametrically opposed pairs.

9. A Christmas tree stand according to claim 6, wherein said container includes a regular plurality of exterior vertical ridges formed thereon, one for each stabilizing leg, and said stabilizing legs include corresponding vertical grooves for sliding releasable attachment to the container.

10. A Christmas tree stand according to claim 9, wherein said container, said guide members and said stabilizing legs are made of a durable plastic.

11. A Christmas tree stand according to claim 10, wherein said solid, resilient thermoplastic of the plunger member and said durable plastic of the container, guide members and stabilizing legs are the same material.

12. A Christmas tree stand according to claim 11, wherein said same material is polypropylene or nylon.

13. A Christmas tree stand according to claim 10, wherein said bottom wall is formed with a concentric arrangement of annular ledges to closely receive the bottoms of tree trunks of differing diameters.

14. A Christmas tree stand according to claim 1, wherein the bottom wall of the container is contoured to form inwardly and downwardly stepped ridges to receive the bottoms of tree trunks of various diameters.

* * * * *